(12) United States Patent
Deutsch-Aboulmahassine

(10) Patent No.: US 7,627,983 B1
(45) Date of Patent: Dec. 8, 2009

(54) MODULAR, WALL-MOUNTED PLANT GROWING SYSTEM

(76) Inventor: Elizabeth Devon Deutsch-Aboulmahassine, 1919 19th St., San Francisco, CA (US) 94107

( * ) Notice: Subject to any disclaimer, the term of this patent is extended or adjusted under 35 U.S.C. 154(b) by 493 days.

(21) Appl. No.: 11/248,996

(22) Filed: Oct. 12, 2005

Related U.S. Application Data

(60) Provisional application No. 60/619,093, filed on Oct. 15, 2004.

(51) Int. Cl.
*A01G 9/02* (2006.01)
(52) U.S. Cl. .......................................... 47/83; 47/65.5
(58) Field of Classification Search ............... 47/82, 47/83, 65.5, 67, 66.1; D6/556
See application file for complete search history.

(56) References Cited

U.S. PATENT DOCUMENTS

| | | | |
|---|---|---|---|
| 4,499,688 A * | 2/1985 | Droll | 47/83 |
| 4,658,541 A | 4/1987 | Haile | |
| 4,779,378 A | 10/1988 | Mason | |
| 4,896,456 A | 1/1990 | Grant | |
| 4,961,284 A | 10/1990 | Williams | |
| 5,361,537 A | 11/1994 | Behrens | |
| 5,363,594 A | 11/1994 | Davis | |
| 5,741,339 A * | 4/1998 | DuMars et al. | 8/611 |
| 6,625,927 B2 | 9/2003 | Woodruff | |
| 6,634,138 B2 * | 10/2003 | Katzman | 47/79 |
| 6,725,601 B2 | 4/2004 | Chick | |

* cited by examiner

*Primary Examiner*—Michael R Mansen
*Assistant Examiner*—Monica L Williams
(74) *Attorney, Agent, or Firm*—Howard Cohen

(57) ABSTRACT

A living wall comprises a plurality of planter tiles and base tiles configured to be joined in edge abutting fashion to tessellate a vertical surface. Planter tiles include a curved coffer wall extending from a front surface of the base panel to define an upwardly opening container for soil and plants. Base tiles and planter tiles may be fabricated from a porous material that allows a soaker supply at the top of the tile layout to water the entire vertical matrix by seepage through the tiles. In another embodiment, bio-blocks in stacked array having cavities for soil and water treatment media, and cladding panels are secured to one surface of the stacked array with openings for plants growing in the soil media.

6 Claims, 8 Drawing Sheets

MODULAR, WALL-MOUNTED PLANT GROWING SYSTEM

CROSS-REFERENCE TO RELATED APPLICATIONS

This application claims the benefit of the filing date of Provisional Application Ser. No. 60/619,093, filed Oct. 15, 2004.

FEDERALLY SPONSORED RESEARCH

Not applicable.

SEQUENCE LISTING, ETC ON CD

Not applicable.

BACKGROUND OF THE INVENTION

1. Field of the Invention

This invention relates to systems for biological treatment and support on the vertical walls of manmade structures and, in particular, to plant growing systems that are modular and adaptable to many different site and building conditions.

2. Description of Related Art

As urban and suburban density increase, human impact on local flora and fauna as well as migrating species and their required habitat becomes ever greater. The health of all bioregions effects all creatures—humans can no longer afford the naive perspective of separating ourselves from the health of the planet—beginning with one's own particular bio-region. Loss of habitat for local wildlife is intrinsically connected with the increase in cement mass at the same time that concrete has been established as being a significant factor in global warming. While roadways and structures require the loss of horizontal habitat there is potential for us to transform the vertical surfaces we are creating into life supporting systems.

For example; birds, butterflies, and other invertebrates perceive freeways to be waterways (they do often flow over culverted rivers and streams). Creatures see the glinting of the sun on the cars as water—they follow these "rivers" searching for life. By transforming sterile freeway walls into life-sustaining gardens we can protect these creatures, preserve biodiversity, and beautify our environment—all vertical surfaces can be modified thusly. With the knowledge from the scientific (naturalist) communities and the cooperation of urban planning departments as well as private enterprise, modular vehicles for habitat and landscaping, significant transformation and re-greening can rapidly occur.

Most urban centers are located on prime arable land. Due to the rapid urbanization of the 20th century, there has been a substantial loss of these fertile lands. The conversion of this land from agrarian to urban uses has led to local environmental effects that are detrimental to the local urban inhabitants and well as the global environment. For example, vegetation that grew on these arable lands converted carbon dioxide to oxygen, and urbanization decreases this natural, beneficial process. Not only is oxygen necessary to sustain life, but carbon dioxide is a primary greenhouse gas that is responsible for the steadily rising average atmospheric temperature. An increase in vegetation in an urban setting can reduce the amount of greenhouse gases and help reduce global warming. In addition, urban population concentrations generate large amounts of air pollution. Vegetation filters out air pollutants, and increasing the abundance of vegetation in an urban setting can improve air quality. Likewise, urban centers are heat islands where sunlight falling on manmade structures and roads increases temperature, as well as the burning of fossil fuels for heating and transportation. As a result of this heat increase, use of air conditioning increases, further pumping heat into the urban environment. Vegetation provides a significant cooling effect by absorbing sunlight for photo synthesis, and evaporation from vegetation further cools the environment. It is also well-recognized that an increase of vegetation in an urban setting gives the psychological benefit to urban inhabitants of having access to nature-filled environments. Moreover, foliage placed in a cityscape acts to soften the visual impact of the hard surfaces, rectilinearity, and daunting presence of very large structures.

One technique to achieve the goal of incorporating more vegetation in an urban setting is to attach vegetation directly to a freestanding structure. The oldest means of accomplishing this is to plant climbing vines at the base of a building and nurture their growth. This method also creates an aesthetically pleasing environment, but there are some problems with this practice. It takes decades for a structure to be enveloped by vegetation. This method is also limited because only a small number of species of vegetation are suitable for use with this method, and there is a limit to the climbing height of most vines.

The prior art is deficient in providing plant growing systems that are easily mounted on existing building walls and similar structures. Many proposed systems require substantial modification of the existing structure, and/or separate structural elements to be applied to the existing buildings. These factors result in cost factors that render them impractical for a building owner or operator, even though the urban population as a whole would benefit from the addition of the vegetation.

BRIEF SUMMARY OF THE INVENTION

The invention generally comprises a living wall system featuring modular components that may be applied to a wide variety of structures. In general, the modules are fabricated of porous materials that are lightweight, such as low density concrete and cementitious blends, ceramics, or foam materials. A preferred embodiment employs natural materials such as coca coir, felt made of plant fibers, and the like. Non-porous modules are combined when water containment is needed or desired.

In one aspect, the invention provides a plurality of living wall modules that are constructed like tiles and are configured to be joined in edge abutting fashion to fill a surface, such as an exterior wall of a building. Each modular tile includes a base panel having a geometric configuration that tessellates a plane. Some of the modular tiles, known hereinafter as planter tiles, also include a curved coffer wall extending from a front surface of the base panel, the coffer wall having side edges and lower edges joined to the base panel to define therewith an upwardly opening container for soil and plants retained therein. The planter tiles and base tiles may be arranged in an esthetically attractive pattern on a vertical surface using either chemical fastening like standard tile adhesive, mortar, and grout or mechanical fastening like screws or attached to a standard tracking system to offset the modules from the wall. Water proofing the substrate followed by mechanical fastening is also an option for attachment. The plant and soil materials supported in the planter tiles are selected for their suitability to the climate and exposure of the vertical surface, and for a growth habit that is amenable to the planter arrangement. Filtration materials like sand or biological water treatment mediums can also be placed in the tile cavities. Watering supply tubes may be extended in the attachment tracking, in the molded channels, or in seams between adjacent modular tiles; alternatively, the base tiles and planter tiles may be fabricated from a porous material that allows a soaker supply at the top of the tile layout to water the entire vertical matrix by seepage through the tiles.

The modular tile system may be formatted to comprise any tessellation or any interlocking pattern, and simple examples are shown herein; i.e. hexagonal base tiles and planter tiles, or diamond shapes based on rectangular tiles having one vertex disposed uppermost. In general, any shape may be used that enables the vertical plane to be tessellated in a visually pleasing manner, and such shapes may be not a regular polygonal, but rather a configuration having curved and/or irregular sides. In any case, the materials i.e. plants, supported in the vertical array of planters comprises a living biological system, and its integrated presence encourages and supports a diverse fauna, such as butterflies, bees, and other insects, and birds that are attracted to the insects and flowers.

In another aspect, the invention provides a plurality of living wall modules that are configured as large wall panels having soil cavities formed therein with openings that extend to the exterior surface of the panels. The exterior openings may be configured as sculpted or geometric shapes that extend laterally and vertically and have esthetic appeal in themselves, and which are complemented by the plants selected to grow in the soil in the cavities. The panels may be formed of the same types of materials as the modular tile system described above, and may be porous to enable water to seep through to the plants in the soil cavities, or may incorporate drip line or spot watering systems. This embodiment may include large format, stacked structural bio-blocks having cavities for retaining plant growing media, with the panels secured to the stacked array so that the plants supported in the media may extend through the exterior openings of the panels.

The modular living wall system may be applied to a vertical surface by bolting to the existing structure, a technique that more easily permits removal and replacement of individual modules. This approach also does not rely on tessellating the plane of the vertical surface, so that the modules may be arranged in any desired matrix or array. The modules may be spaced from the existing structure by simple standoffs secured to the back surface of the base panel.

Alternatively, the invention provides a plurality of davits or similar supports at the top edge of the wall, with suspending cables extending downwardly to connect to the living wall panels in vertically supporting fashion. This technique enables application of the living wall concept to an existing building wall without requiring support components that pierce the building wall, so that the building's weatherproofing remains intact. It also enables applications to walls having substantial glass surfaces and the like.

In any of these embodiments, the discrete plantings or biological fill of each module may embody horticultural selections that are selected for their foliage, growth habit, blossom characteristics, size, and other factors. Unlike building walls covered in the monotonous dark green of ivy, the different plant selections may exhibit a wide variety of leaf color, flowering season, wall coverage, and more. The horticultural plants may also be selected to attract butterflies, birds, hummingbirds, and other life forms in a harmonious combination that constitutes a living biological system. Filtering mediums like sand or inoculated soil or growth medium can be used as well as or in place of plants in situations where the water filtration is the focus of the installation.

In addition to its use on building walls, the invention may also be applied to retaining walls, freeway sound barrier walls, and other non-building structures. Furthermore, the various embodiments of the invention are intended for use in interior spaces as well as outdoor use, for example in building lobbies, atria, entryways, and the like.

DETAILED DESCRIPTION OF THE INVENTION

Figure 1:
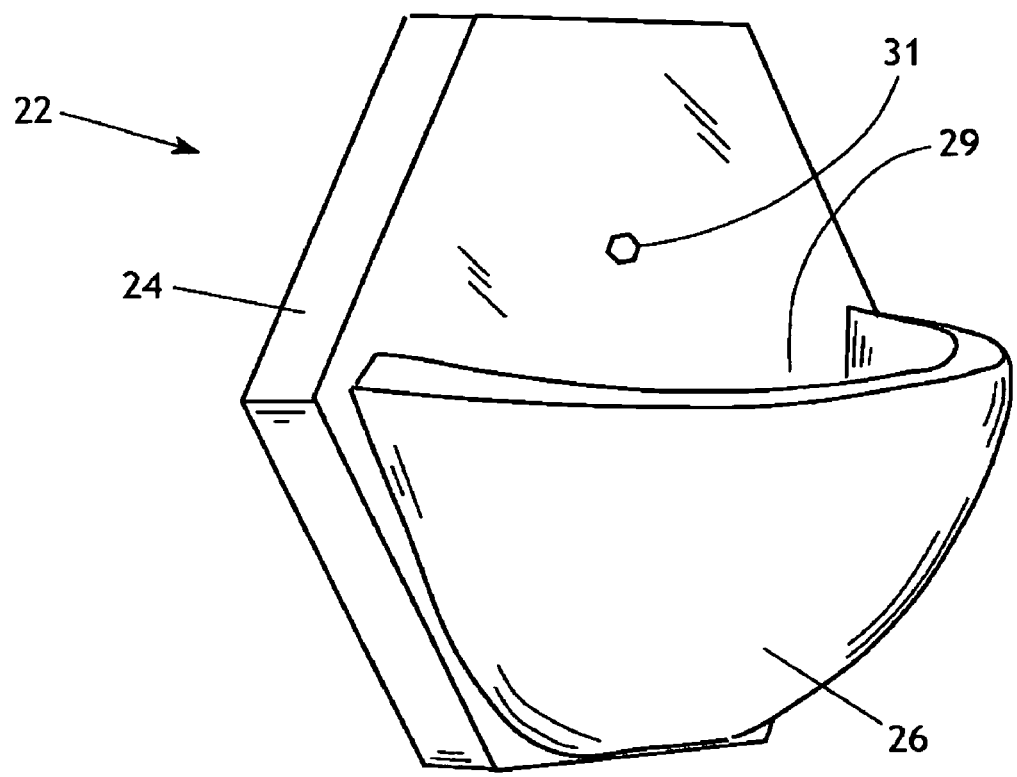
FIG. 1 is a perspective view of one embodiment of a living wall planter module.
Figure 2:
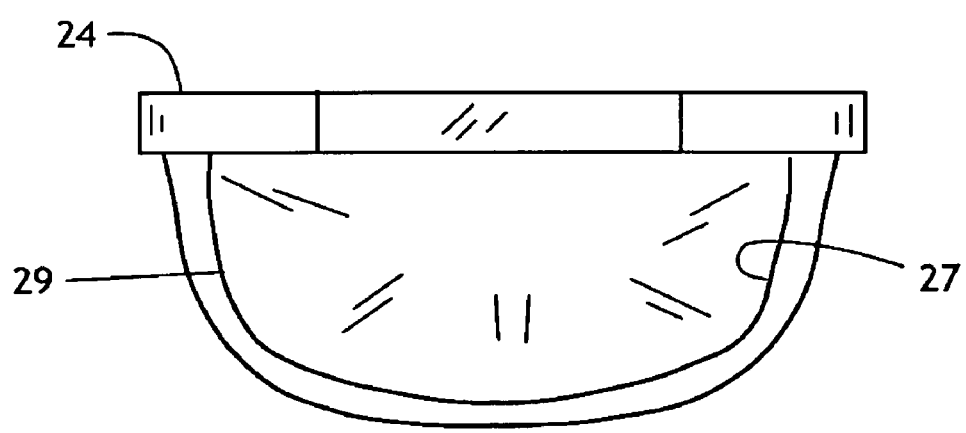
FIG. 2 is a top view of the living wall planter module of FIG. 1.
Figure 3:
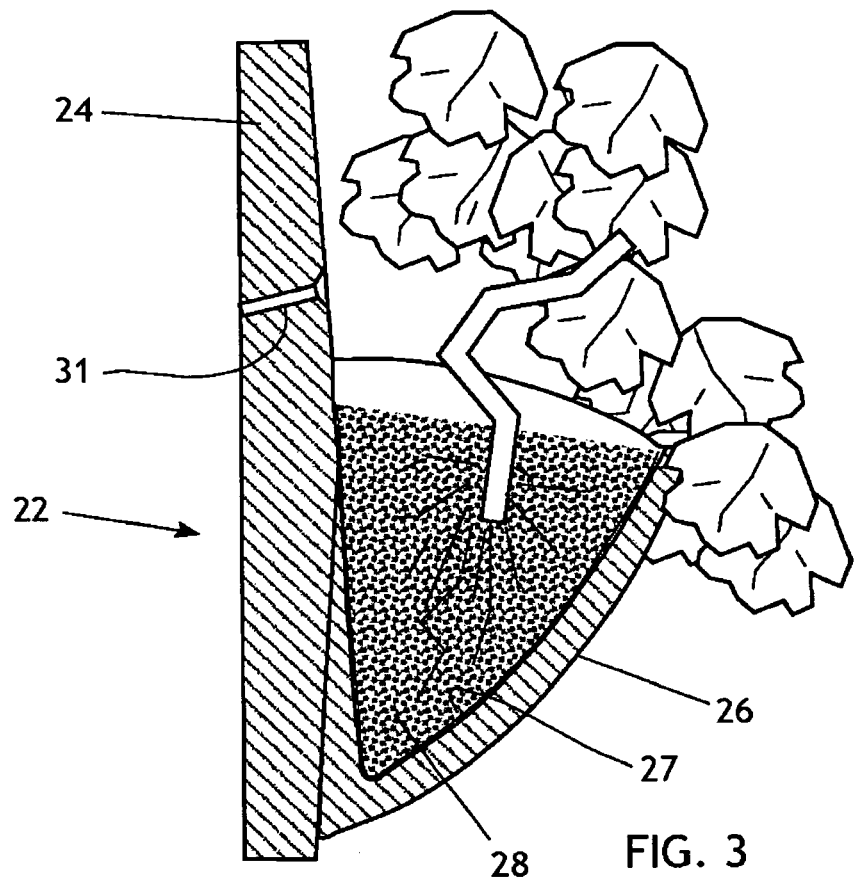
FIG. 3 is a cross-sectional side view of the planter module of FIGS. 1 and 2.
Figure 4:
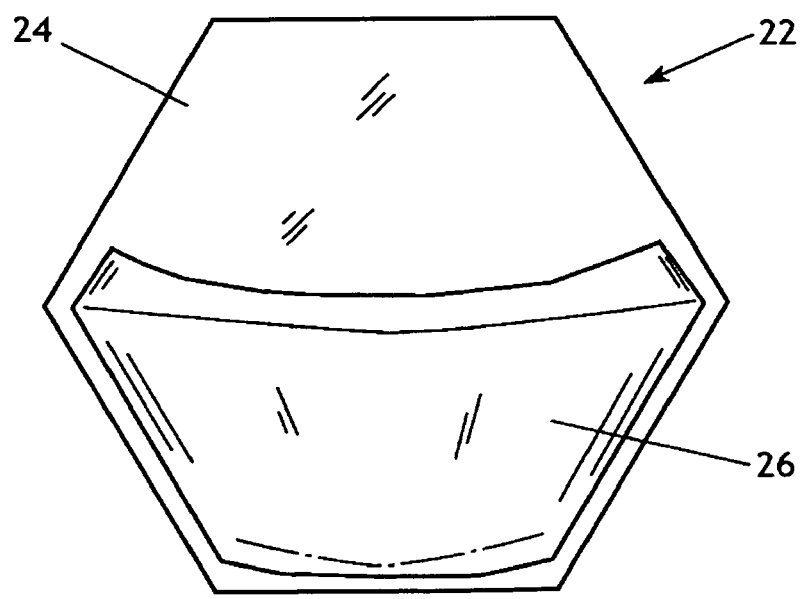
FIG. 4 is a front elevation of the planter module of FIGS. 1-3.

The present invention generally comprises a living wall system featuring modular components that may be applied to a wide variety of structures. With regard to FIGS. 1-5, one embodiment of the invention provides a plurality of living wall modules 21 that are constructed likes tiles, and are produced in two models: planter tiles 22 and base tiles 23. Both models include a base panel 24 having a perimeter configured as a geometric shape that permits tessellation of a plane; i.e., the base tiles and planter tiles may be installed in edge-abutting fashion as an array that covers a plane with no gaps therebetween. Although the tile formats shown herein involve base tiles and planter tiles having the same geometric forms, they may have complementary forms that enable tessellation, as is known in the prior art. In the illustrated embodiment the base panel is formed as a hexagon having horizontal upper and lower edges for both the planter tiles and base tiles.

Each planter tile 22 includes a curved coffer wall 26 extending from the front surface of the base panel 24. The coffer wall 26 has perimeter edges that are congruent with the lower edge and the pair of adjacent side edges of the base panel. The coffer wall 26 bows outwardly from the plane of the base panel to define therebetween a cavity 27 for containing soil or other growth media 28. The cavity 27 has an upwardly directed opening 29 to allow one or more plants to be rooted in the growing media and extend upwardly and outwardly from the module. A mounting hole 31 may be formed in the upper medial extent of the base panel 24 to facilitate securing the module to a vertical structure using a screw or bolt.

Figure 5:
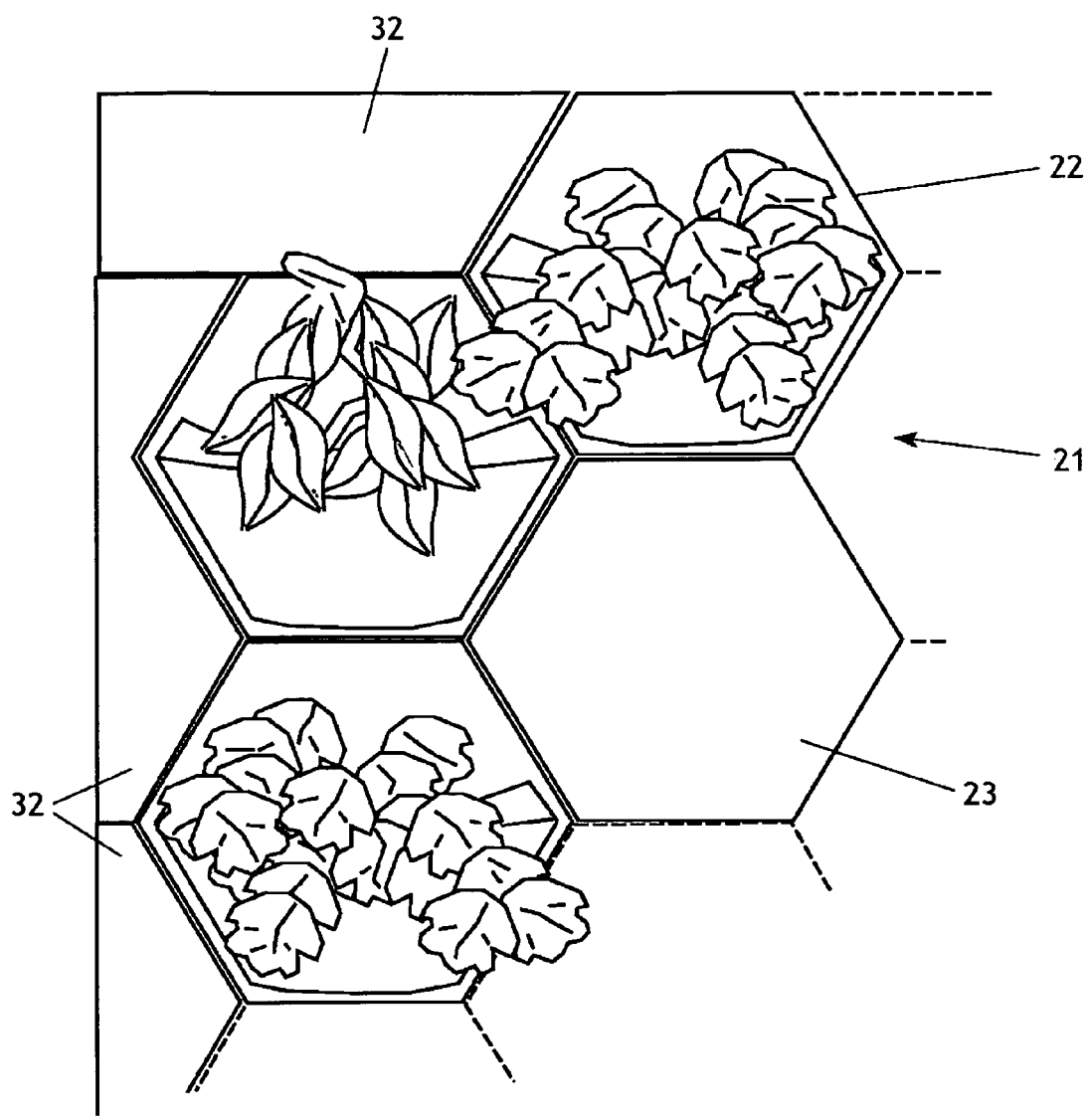
FIG. 5 is an exemplary layout of the planter modules of FIGS. 1-4.

As shown in FIG. 5, the planter tiles and base tiles may be arrayed on a vertical surface in any pattern that the user finds pleasing and practical. Border components 32 may be provided to blend the non-rectilinear edges of the tile matrix with the horizontal and vertical wall boundaries. It is possible to use planter tiles 22 exclusively in the array, or to intermix the base tiles with the planter tiles. The latter option provides more space for the growth of the plants supported in the planter tiles, and enables easy visualization of individual plants within the matrix. The plants supported in the planter tiles may be selected for their suitability to the climate and exposure of the vertical surface, and for a growth habit that is amenable to the planter arrangement.

The planter tiles and base tiles may be laid on a vertical surface using standard tile adhesive, mortar, and grout, and arranged in an esthetically attractive pattern. Alternatively, the tiles may be bolted or screwed to the vertical surface, a technique that permits easy removal and replacement of the tiles when necessary. Watering supply tubes may be extended in the seams between adjacent modular tiles; alternatively, the base tiles and planter tiles may be fabricated from a porous material that allows a soaker supply at the top of the tile layout to water the entire vertical matrix by gravital seepage through the tiles. Porous materials that are lightweight, such as low density concrete and cementitious blends, ceramics, or foam materials may be used to form the tiles. A preferred embodiment employs natural materials such as coconut coir, felt made of plant fibers or peat, and the like.

Figure 6:
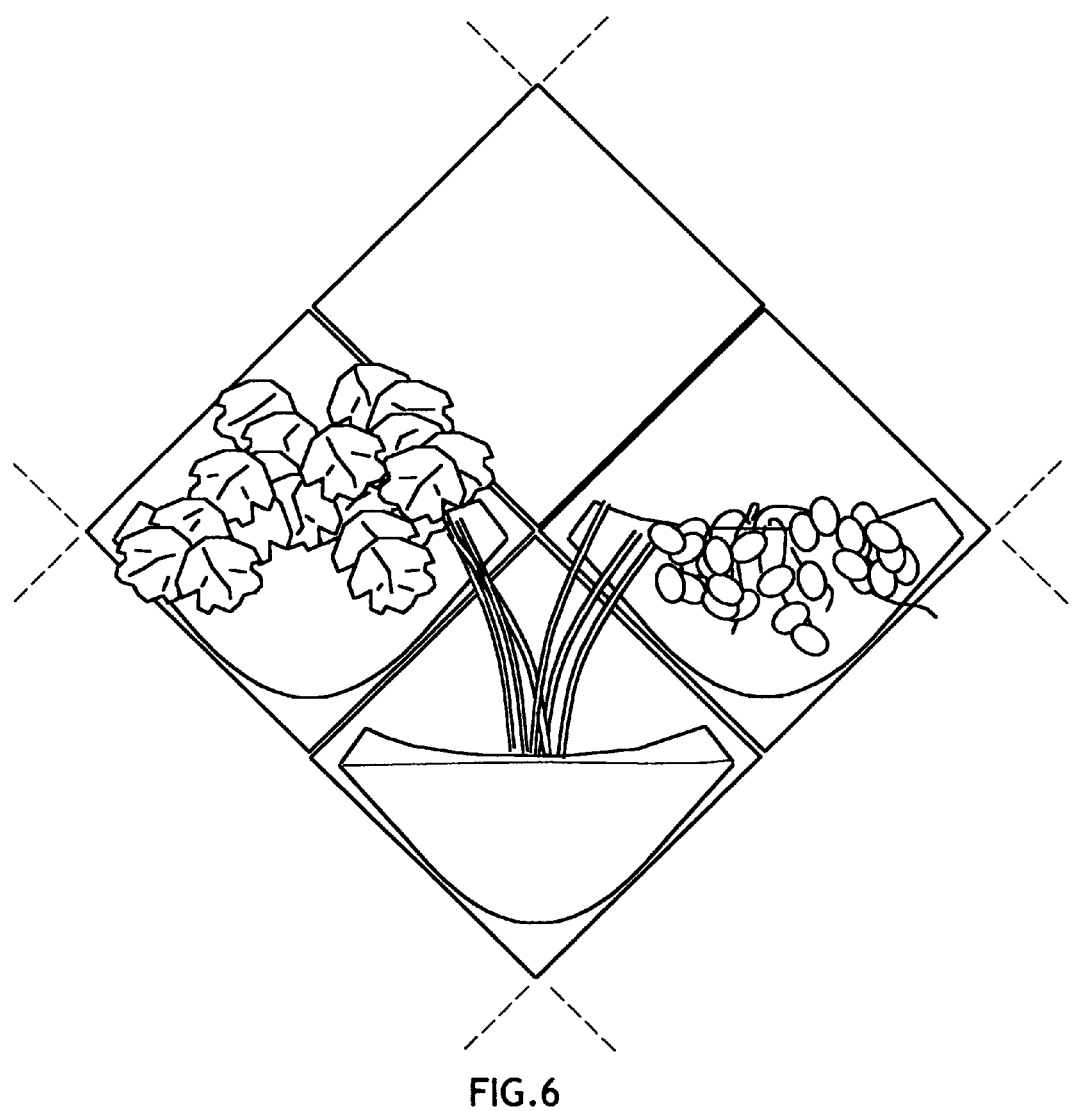
FIG. 6 is an exemplary layout of planter modules having a diamond configuration.

With regard to FIG. 6, the planter tiles and base tiles may be configured in a diamond form; that is, quadrilateral tiles having a square or rectangular or rhomboidal shape, with the opposed edges disposed in obliquely to horizontal and vertical. The simplest version of this form, shown in FIG. 6, includes a square base panel oriented so that the diagonals thereof are aligned in the horizontal and vertical directions. The coffer wall and cavity for containing soil and plant roots is substantially similar to that shown in the previous embodiment. As before, all of the modules may be planter tiles, or there may be an admixture of both planter and base tiles.

Figure 9A:
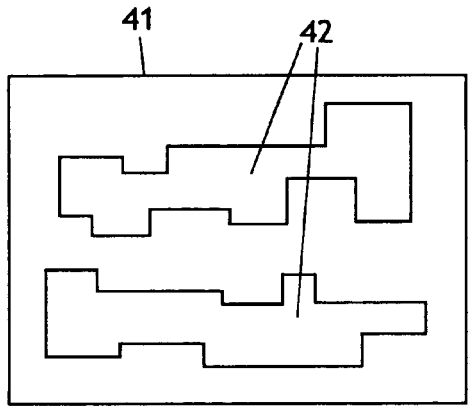
FIGS. 9A and 9B are front elevations of planter wall panel units in empty and planted dispositions, respectively.
Figure 10A:
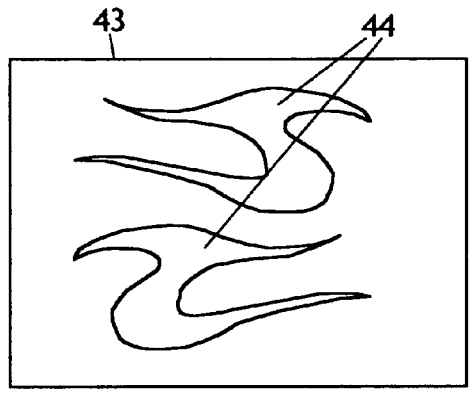
FIG. 10A and 10B are front elevations of another embodiment of planter wall panel units in empty and planted dispositions, respectively.
Figure 11A:
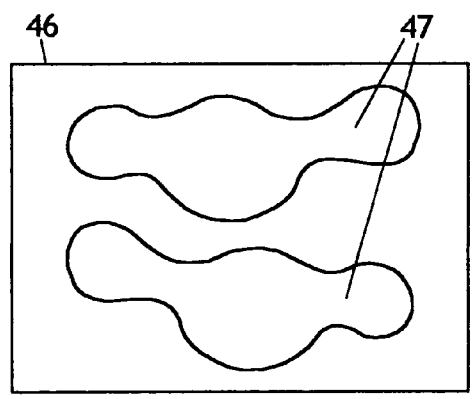
FIG. 11A and 11B are front elevations of a further embodiment of planter wall panel units in empty and planted dispositions, respectively.

With regard to FIGS. 9A, 10A, and 11A, another embodiment of the invention includes a plurality of wall modules that are designed to support plant life in a living wall system. The wall modules are dimensioned similarly to construction panels, in the range of 4 ft. by 4 ft. to 8 ft by 8 ft., much larger than the tiles of the previous embodiments which are in the range of 2 ft.-3 ft. wide. In wall panel 41 (FIG. 9A), the panel is provided with a pair of openings 42 that are fashioned in irregular rectilinear geometric forms, the openings leading to cavities that contain soil in a manner similar to the previous embodiments. Wall panel 43 (FIG. 10A) is provided with openings 44 that embody stylized curves, and wall panel 46 (FIG. 11A) includes openings 47 that embody a contoured, organic appearance. The panels 41, 43, and 46 are constructed with coffer walls that define the soil-containing cavities, as described above, or they may be constructed with sufficient thickness that the cavities are contained therewithin.

Figure 7:
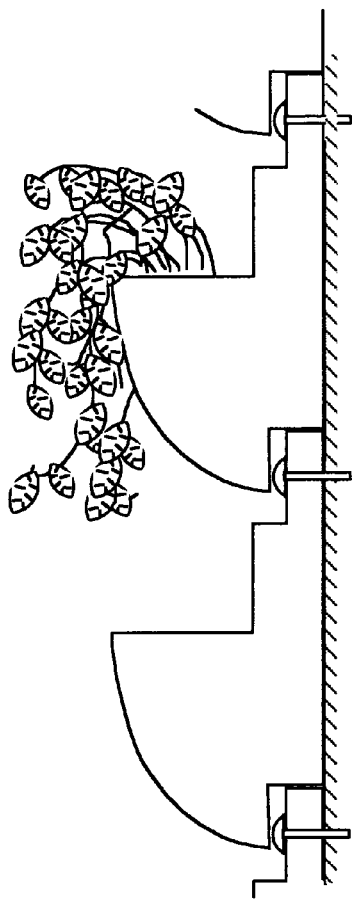
FIG. 7 is a side elevation of one technique for securing planter modules to a structural wall.
Figure 9B:
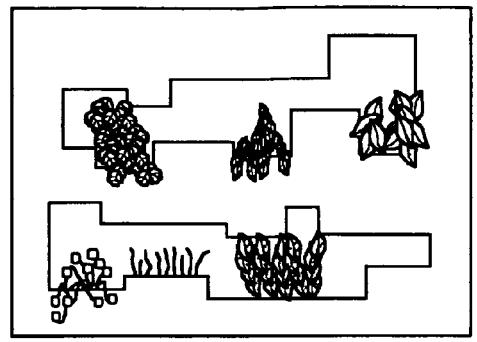
Figure 10B:
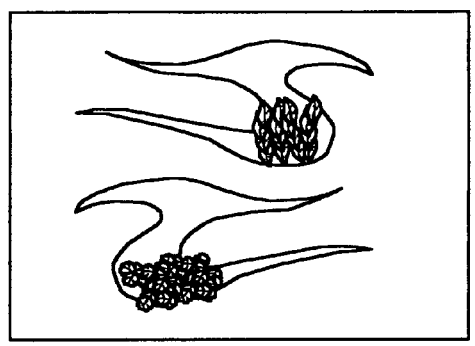
Figure 11B:
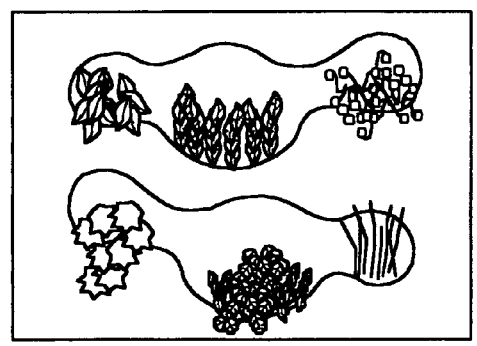
Figure 12:
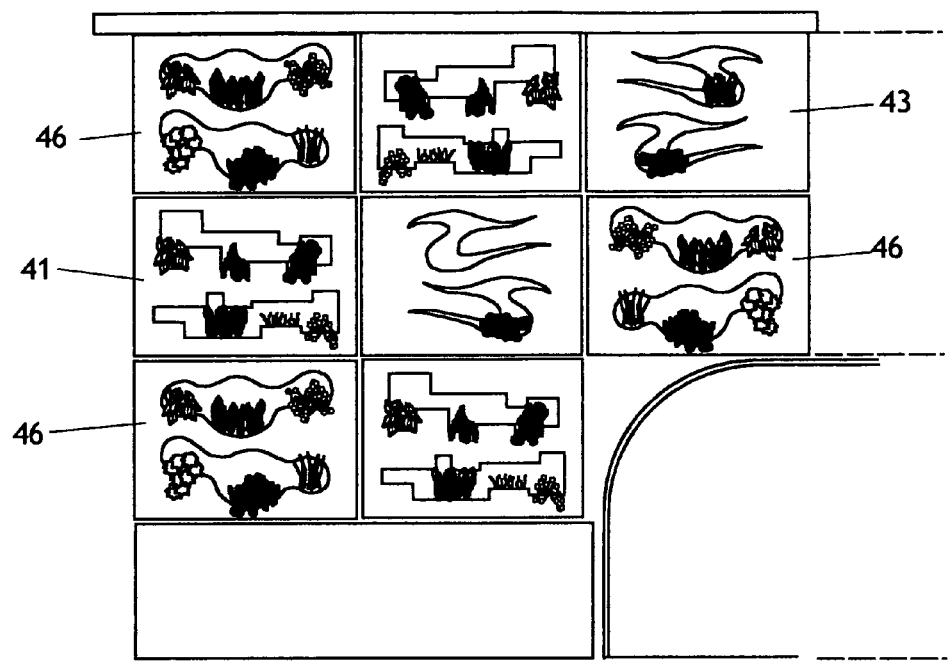
FIG. 12 is a front elevation of a building supporting an array of planter wall panels as depicted in FIGS. 10-12.

The living wall panels may be secured to any vertical structure, and planted as suggested in FIGS. 9B, 10B, and 11B to display the flowers and foliage growing from the openings 42, 44, and 47. The living wall panels may be secured to the exterior surface of a portion of a building, as shown in FIG. 12, to form an extensive green living installation on the building. The living wall panels may be bolted to the exterior of the building, either flush thereto (as suggested in FIG. 7) or separated therefrom by standoffs. Note that individual units may be removed and replaced as required during maintenance.

Figure 14:
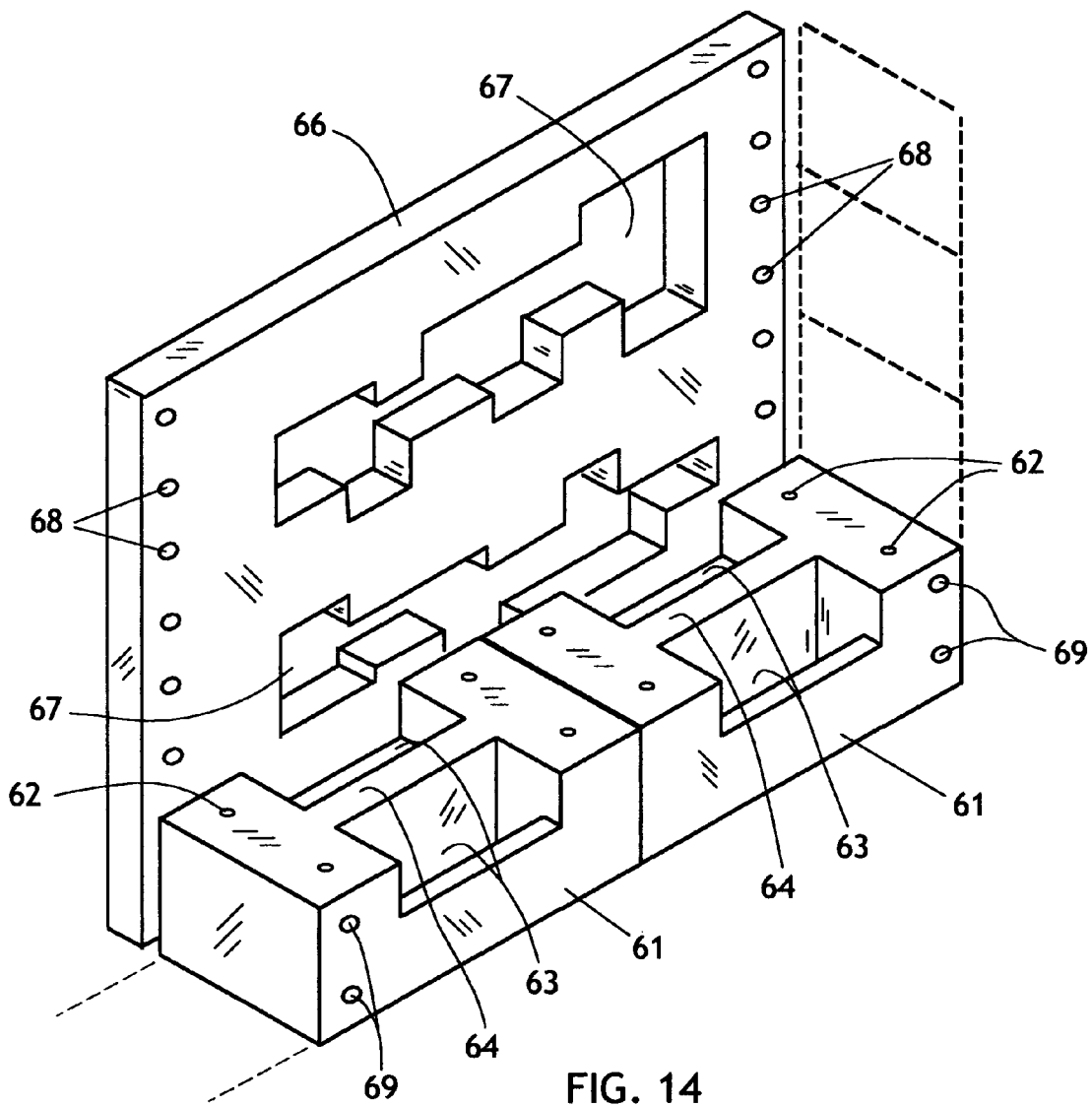
FIG. 14 is a perspective elevation of a further embodiment in which the planter wall panels are combined with large structural bio-blocks having plant media cavities.

With regard to FIG. 14, a further embodiment of the invention makes use of living wall panels such as those shown in the previous embodiments of FIGS. 9-12. A plurality of bio-blocks 61 are provided, each block being rectangular and capable of being stacked in a vertical array. Holes 62 in the upper surface and lower surface (not shown) enable the blocks to be pinned or otherwise fastened together vertically for stability to form a stacked block wall. Each block is provided with a pair of cavities 63 separated by medial wall 64, each cavity opening upwardly as well as laterally outwardly to the long side of each block. The cavities at adjacent sides of the blocks 61 may be filled with plant growing media, and furnished with selected plants. A wall panel 66 may then be secured to the side of the block wall that is planted, the wall panel having openings 67 that provide air and light to the plants and enable the plants to extend outwardly therefrom. Wall panel 66, which is shown in FIG. 14 as similar to panel 41, is provided with mounting holes 68 adjacent opposed vertical edges that register with mounting holes 69 in the blocks 61, so that the panel 66 may be secured to the stacked block wall and provide an esthetically pleasing façade or cladding. This embodiment does not require an existing structure; rather, it forms a structure in and of itself. Note that the blocks 61 may support plants on the interior surface as well as the exterior surface so that, for example, the structure may define exterior and interior wall presentations. The materials for forming this embodiment may comprise any of those described previously.

Figure 8:
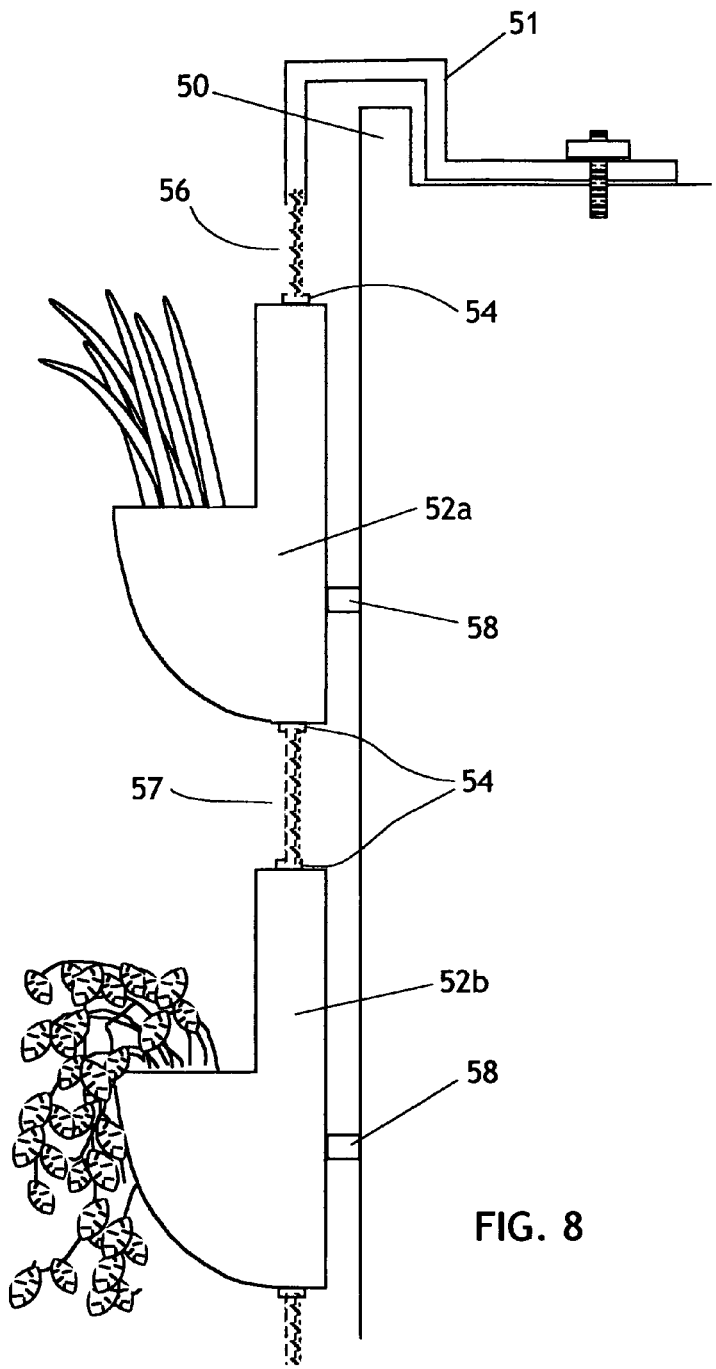
FIG. 8 is a side elevation of another technique for securing planter modules to a structure.

Alternatively, the living wall panels 41, 43, or 46, or the modular tile embodiments of FIGS. 1-6, may be suspended adjacent to the wall surface of a structure. As shown in FIG. 8, a plurality of davits 51 or similar cantilever supports are secured to the top of the structure, extending over the parapet 50. The living wall modular units 52a, 52b, . . . 52n are constructed similarly to the previous embodiments, with the inclusion of suspender brackets 54 at the top and bottom edges. A steel cable 56 or the like extends from each davit 51 to the uppermost module 52a and is secured to the bracket 54. Likewise, the next lower module 52b is suspended from the upper module 52a by cable 57, and so on in serial connection. Each module 52 includes standoff bushings 58 to prevent contact damage to the building wall surface.

In a modification of the embodiment of FIG. 8, the steel cable extending from the davit 51 may extend vertically downwardly through some or all of the modules 52, eliminating the brackets 54. The steel cable provides significant tensile strength to the modules and, moreover, delineates a path for irrigation water provided from above to seep downwardly through the modules to water all the modular units. At the bottom of the vertical array, the water may drip from module 52n onto a bio-swale that may be incorporated into the landscaping at the base of the supporting wall.

Figure 13:
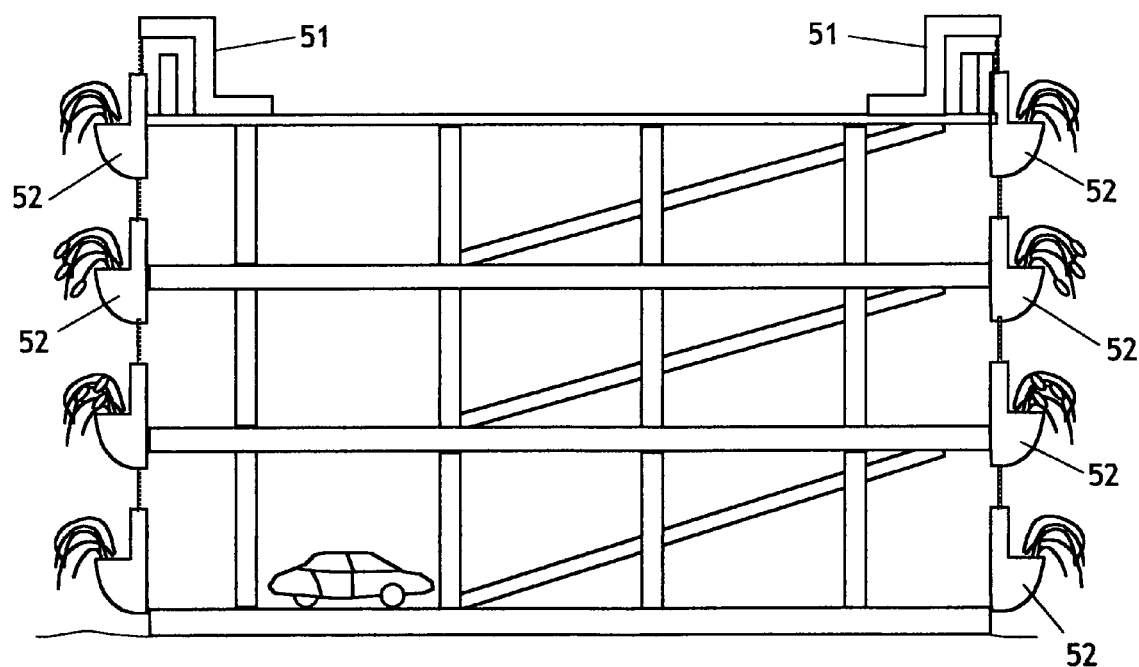
FIG. 13 is a side elevation of a parking structure supporting a living wall suspended from the top of the structure.

One application of the mounting technique of FIG. 8 is to suspend a plurality of living wall modules at the exterior of a building such a parking structure, as shown in FIG. 13. Such buildings typically do not have continuous vertical walls extending from base to top; rather, they generally have reinforced concrete hip walls at the perimeter of each floor, and substantial openings extending vertically therebetween to admit fresh air and light. The modular living wall units 52 may be spaced vertically to be adjacent to the hip walls of the building, so that the openings for air and light are not diminished. Rather, the presence of living green plants, bearing foliage and flowers, may In any of these exterior wall mounting arrangements, the modules and their plants may be maintained, removed, and replaced using standard techniques and equipment developed for exterior window washing of large buildings.

A critical factor in constructing a living wall in accordance with the embodiments described herein is the choice of plants that are grown in the modules. The plants must be adaptable to the exposure, sunlight, temperature range and climate range of the site. Ideally the plants may be selected to attract butterflies, birds, hummingbirds, and other life forms in a harmonious combination that constitutes a living biological system.

In any of the embodiments described herein, the vertically stacked or spaced components may be employed for water treatment as well as, or in addition to, plant growth. For example, recent changes in building codes require that storm water runoff from a building be treated prior to entering a municipal sewage or runoff system. This invention may provide such treatment by filling upper modules with sand or other filter medium, allowing the water to be purified as it passes vertically through the array. This treatment may be augmented by inoculating the sand or growing media with microrhizome lifeforms, bacteria that remove toxins or heavy metal contamination, and the like. Thus the invention add the function of water treatment to the other advantageous processes it performs.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A living wall system for growing botanical lifeforms on a preexisting planar vertical structure, including:
   a plurality of living wall modules, each of said modules having a base panel, said base panels configured to be capable of being disposed in an edge-abutting relationship arranged in a tessellated array; each base panel impinging directly on said pre-existing planar vertical structure and including means for securing and supporting each base panel on said pre-existing planar vertical structure;
   a first planter tile type of said modules having a coffer wall, said coffer wall having bottom and opposed side perimetrical edge portions joined directly to a front surface of said base panel and having a central edge portion spaced apart from said front surface, whereby said coffer wall tapers inwardly as it extends downwardly from said central edge portion to said side and bottom edges to define an upwardly opening flared cavity adapted to contain a plant growing medium; said central edge portion extending at a medial height portion of said front surface of said base panel, whereby an upper height portion of said front surface of said base panel extends freely above said central edge portion of said coffer wall;
   said coffer wall and base panel comprising a unitary modular structure of the same material; and
   a second base tile type of said modules having said base panel and lacking any coffer wall, said base panels of said first and second types of modules tiles being shaped to be assemblable in a plane in said edge-abutting relationship capable of forming said tessellated array.

2. The living wall system of claim 1, wherein said base panel of said planter tile modules includes a first lower edge and a first pair of side edges extending obliquely upwardly from opposed ends of said first lower edge, and said bottom and opposed side perimetrical edge portions of said coffer wall includes a continuous edge portion that is congruent with said first lower and side edges and joined to said base panel adjacent to said lower and side edges.

3. The living wall system of claim 1, wherein said base panel is configured as a hexagon.

4. The living wall system of claim 1, wherein said base panel is configured as a diamond shape.

5. The living wall system of claim 1, wherein said means for securing and supporting each of said panels on the pre-existing planar vertical structure includes a mounting hole extending through said base panel in said upper height portion of said front surface.

6. A living wall system for growing botanical lifeforms on a pre-existing planar vertical structure, including:
   a plurality of living wall modules, each of said modules having a base panel, said base panels configured to be capable of being disposed in an edge-abutting relationship arranged in a tessellated array; each base panel impinging directly on said pre-existing planar vertical structure and including means for securing and supporting each base panel on said pre-existing planar vertical structure;
   a first planter tile type of said modules having a coffer wall, said coffer wall having bottom and opposed side perimetrical edge portions joined directly to a front surface of said base panel and having a central portion spaced apart from said front surface, whereby said coffer wall flares outwardly as it extends upwardly from said side and bottom edges to define an upwardly opening flared cavity adapted to contain a plant growing medium; said central edge portion extending at a medial height portion of said front surface of said base panel, whereby an upper height portion of said front surface of said base panel extends freely above said central edge portion of said coffer wall;
   said means for securing and supporting each base panel including a mounting hole extending through said base panel in said upper height portion of said front surface;
   said coffer wall and base panel comprising a unitary modular structure of the same material; and
   a second base tile type of said modules having said base panel and lacking any coffer wall, said base panels of said first and second types of modules tiles being shaped to be assemblable in a plane in said edge-abutting relationship capable of forming said tessellated array.

* * * * *